(12) United States Patent
Dalsgaard et al.

(10) Patent No.: US 9,924,481 B2
(45) Date of Patent: Mar. 20, 2018

(54) INDICATION OF IN/OUT OF DUAL CONNECTIVITY SYNCHRONIZED CONDITION

(71) Applicant: NOKIA TECHNOLOGIES OY, Espoo (FI)

(72) Inventors: Lars Dalsgaard, Oulu (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 67 days.

(21) Appl. No.: 14/934,821

(22) Filed: Nov. 6, 2015

(65) Prior Publication Data

US 2016/0135137 A1     May 12, 2016

Related U.S. Application Data

(60) Provisional application No. 62/076,806, filed on Nov. 7, 2014.

(51) Int. Cl.
*H04J 3/06*     (2006.01)
*H04W 56/00*     (2009.01)

(52) U.S. Cl.
CPC ......... *H04W 56/002* (2013.01); *H04W 56/00* (2013.01)

(58) Field of Classification Search
CPC .................................................. H04W 56/002
See application file for complete search history.

(56) References Cited

U.S. PATENT DOCUMENTS

2013/0279434 A1    10/2013   Dinan
2014/0295860 A1    10/2014   Kuo
2014/0349701 A1*   11/2014   Vajapeyam ........... H04W 52/32
                                                      455/522
2015/0223282 A1*   8/2015   Vajapeyam ........... H04L 1/1887
                                                      370/221
2015/0327249 A1*   11/2015   Kitazoe ............. H04W 72/0413
                                                      370/329

FOREIGN PATENT DOCUMENTS

WO     2008/133567 A1    11/2008

OTHER PUBLICATIONS

ZTE, "Remaining Issues on Dual Connectivity", 3GPP TSG RAN WG1 Meeting #78bis; R1-143798, Oct. 6-10, 2014, 4 pages.
European Search Report application No. 15193325.6 dated Apr. 1, 2016.
European Office Action issued in corresponding European Patent Application No. 15 193 325.6 dated Jun. 1, 2017.
Dec. 7, 2017 Office Action dated in European Patent Application No. 15193325.6.

* cited by examiner

*Primary Examiner* — Samina Choudhry
(74) *Attorney, Agent, or Firm* — Squire Patton Boggs (US) LLP

(57) ABSTRACT

Various communication systems may benefit from indications of conditions existing within the system. For example, communication systems employing dual connectivity may benefit from an indication of whether or not a user equipment is in a dual connectivity synchronized condition. A method can include determining a dual connectivity synchronization condition for the user equipment with respect to at least two base stations. The method can also include reporting the dual connectivity synchronization condition to a network element.

6 Claims, 3 Drawing Sheets

INDICATION OF IN/OUT OF DUAL CONNECTIVITY SYNCHRONIZED CONDITION

CROSS-REFERENCE TO RELATED APPLICATION

This application is related to and claims the benefit and priority of U.S. Provisional Patent Application No. 62/076,806, filed Nov. 7, 2014, the entirety of which is hereby incorporated herein by reference.

BACKGROUND

Field

Various communication systems may benefit from indications of conditions existing within the system. For example, communication systems employing dual connectivity may benefit from an indication of whether or not a user equipment is in a dual connectivity synchronized condition.

Description of the Related Art

Dual connectivity (DC) in the third generation partnership project (3GPP) may be regarded either as synchronized DC or unsynchronized DC. Sometimes unsynchronized DC can be referred to as asynchronous DC or asynchronized DC. DC implementation can depend on the deployment scenario and network. For example, it may be that as long as the timing difference between the primary cell (PCell) and the primary secondary cell (PSCell) is below 33 μsec, the DC scenario can be regarded as synchronized—otherwise the DC scenario can be regarded as not synchronized (async).

In the context of dual connectivity the cells, such as PCell and PSCell, may be assumed to be on different frequencies and belong to different evolved Node Bs (eNBs). Such a deployment may limit the use of certain network (NW) synchronization techniques and may more easily lead to situation where timing drift between the cells may occur more often.

Furthermore, there may be two categories of user equipment (UE). The first category can be UEs that support synchronized DC. The second category of UEs can be UEs that support both synchronized and asynchronized DC. An indication of which category applies to a given UE can be provided by the UE. This indication may be signaled to the network, for example in the form of a UE capability.

For Rel-12, the supported scenarios may only have one cell per cell group (CG). Thus, there may be a PCell and a PSCell only without further SCells in either CG. Additional cases may be supported in later releases. When discussing whether the DC is in a sync or async DC scenario the issue can relate to the observed timing difference between the PCell and PSCell, disregarding whether SCells are configured or not. The SCells may anyway be synchronized to the PCell or PSCell according to whether they are configured by the PCell or PSCell.

SUMMARY

According to a first embodiment, a method can include determining a dual connectivity synchronization condition for a user equipment with respect to at least two base stations. The method can also include reporting the dual connectivity synchronization condition to a network element.

In a variant, the network element may be, for example, at least one of the at least two base stations.

In a variant, the determining can include comparing a timing difference between the at least two base stations with a predetermined threshold.

In a variant, the user equipment may perform the determining while not yet in a dual connectivity configuration or after already configured with dual connectivity.

In a variant, the reporting can include explicitly signaling an indication of the dual connectivity synchronization condition.

In a variant, the indication can be one indication of a plurality of indications related to a plurality of cells in a single report.

In a variant, the reporting can include implying to the network element that a dual connectivity synchronization condition has changed.

In a variant, the implying can be performed by implicit signaling or by user equipment behavior.

In a variant, the user equipment behavior may comprise stopping uplink communication on a primary secondary cell, stopping physical downlink control channel monitoring on primary secondary cell, declaring radio link failure on primary secondary cell, or any combination thereof.

According to a second embodiment, a method can include determining a dual connectivity synchronization condition of a user equipment. The method can also include communicating with the user equipment based on the determined dual connectivity synchronization condition.

In a variant, the method can include receiving an explicit or implicit indication of the dual connectivity synchronization condition. The determination of the dual connectivity synchronization condition can be based on the received indication.

In a variant, the method can include observing a user equipment behavior. The determination of the dual connectivity synchronization condition can be based on the observed behavior.

In a variant, the method can further include configuring the user equipment to perform the method according to the first embodiment, in any of its variants.

According to third and fourth embodiments, an apparatus can include means for performing the method according to the first and second embodiments respectively.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively.

According to seventh and eighth embodiments, a computer program product may encode instructions for performing a process including the method according to the first and second embodiments respectively.

According to ninth and tenth embodiments, a non-transitory computer readable medium may encode instructions that, when executed in hardware, perform a process including the method according to the first and second embodiments respectively.

According to tenth and eleventh embodiments, a system may include at least one apparatus according to the third or fifth embodiments in communication with at least one apparatus according to the fourth or sixth embodiments, respectively.

BRIEF DESCRIPTION OF THE DRAWINGS

For proper understanding of the invention, reference should be made to the accompanying drawings, wherein.

DETAILED DESCRIPTION

During field deployment of dual connectivity (DC), the timing difference between the base stations (BSs) involved in DC may drift and may be within certain limitations. Furthermore, the UE capability, DC sync/async, may be intended to relate to the timing difference observed at the UE receiver. For example, a UE supporting synchronized DC may only be able to cope with an observed timing difference at UE side of e.g. 33 μsec. Other time differences may also be considered.

Depending on the deployment scenario and network layout it may be difficult or even impossible for the network to identify exactly when the conditions for synchronized DC are fulfilled at UE side. Thus, the network may not know when the UE is under synchronized DC conditions and when the UE is not under such conditions. Such absence of information may particularly occur when the deployment scenario is such that DC is carried out between cells of different sizes at different frequencies. An example is when DC is carried between a macro, for example PCell, and small cells, for example PSCell, for offloading situations.

It may be particularly hard to determine whether the conditions are appropriate for the UE in a case when the DC capable UE only supporting synchronized DC is at the border area where the observed timing difference between received signals from the involved BSs is just around the requirement for synchronized DC, such as for example around 33 μsec. In this case, if the UE is only capable of sync DC and the timing difference in the arrived signals at UE side exceeds the limitations of 33 μsec, which is what the UE may be required to be able to handle, the UE may be unable to support DC and the UE behavior may be conventionally unspecified.

Certain embodiments provide solutions for how the UE can handle the cases of entering synchronous DC conditions and potentially exiting sync DC conditions. Thus, certain embodiments provide various ways such solutions can be applied in different situations.

Figure 1:
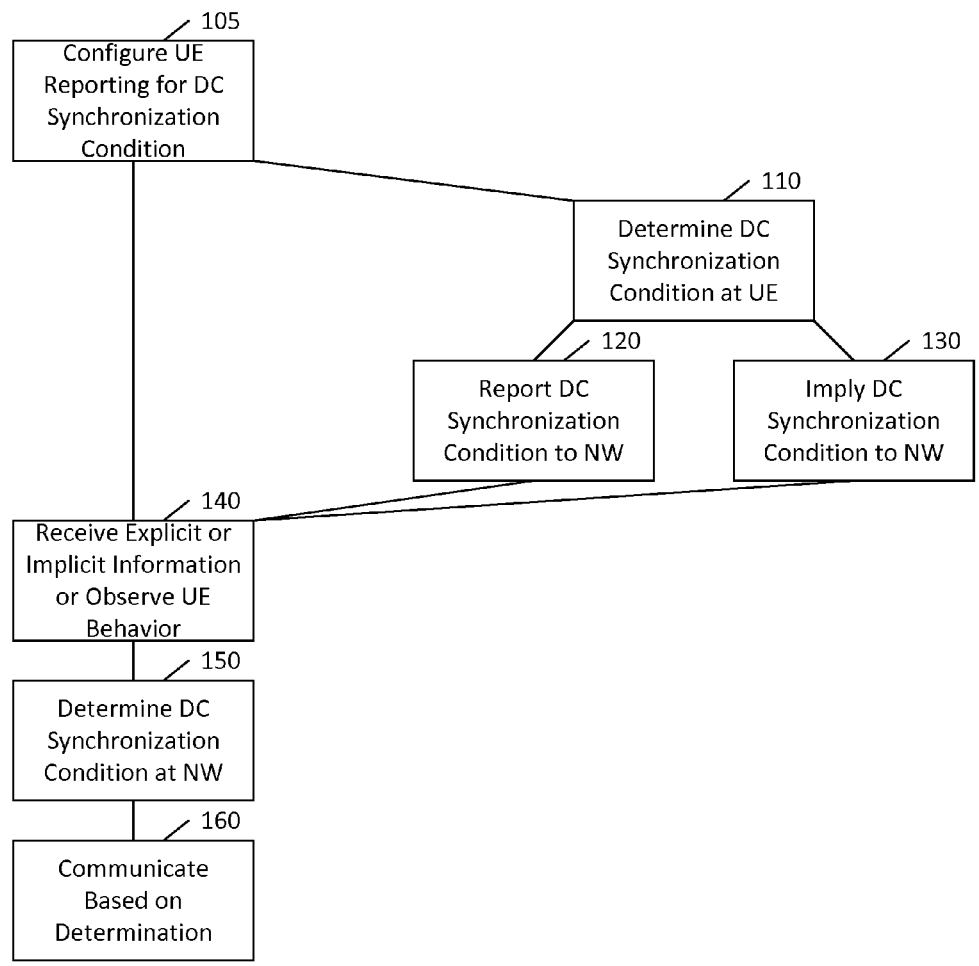
FIG. 1 illustrates a method according to certain embodiments.

FIG. 1 illustrates a method according to certain embodiments. As shown in FIG. 1, at 110 the user equipment (UE) can determine dual connectivity (DC) synchronization conditions locally. At 120, the UE can report the DC synchronization conditions to the network (NW).

There are at least two cases when the UE may determine and report. In a first case a UE may not yet be in DC configuration but may be reporting cells to the network. In a second case, the UE may already be configured with DC and may be needing to exit due to the conditions of synchronized DC not being met anymore, such as if the timing difference exceeds 33 μsec.

A new message can be defined for the purpose of this report. Thus, in certain embodiments the UE can explicitly signal to the network when the sync DC conditions are fulfilled or are no longer fulfilled. This could cover all the cells UE is reporting or could relate to specific cells about which the UE is configured to inform this information.

Alternatively, an existing signaling can be used with an extension, re-use, or new addition to carry information to the network when the sync DC conditions are fulfilled or are no longer fulfilled.

As an alternative to, or in addition to, signaling the network explicitly, at 130 the UE can imply to the NW that the DC synchronization condition has changed. For example, a UE behavior can be specified such that the UE behavior is clear. Thus, there may not be need for further explicit or implicit signaling between UE and network. An example of such behavior may be that the UE may stop UL on PSCell. Other alternative examples of such behavior can include declaring Radio Link Failure (RLF) on the PSCell, Declaration of Uplink (UL) RLF, or another PSCell action.

The following provide some example implementations in light of the enhanced universal mobile telecommunications system (UMTS) terrestrial radio access network (E-UTRAN) specification. Nevertheless, certain embodiments are not limited to E-UTRAN but can be applied in to other radio access technologies.

In one example, as mentioned above, a new dedicated message can be defined in order to enable a UE to signal to a base station (BS) whether a given cell or cells is/are regarded as being a candidate for sync DC. Alternatively the indication can include whether the timing difference between serving cell and neighbor cell, which may be a potential DC candidate, is within the conditions defined for synchronized dual connectivity operation. Alternatively, the actually observed timing difference could be included in the message.

Thus, according to a first example, the UE could report "Cell1: PCI, sync DC ok or DC supported, observed timing difference" and "Cell2: PCI, sync DC nok, observed timing difference." The observed timing difference field could be specified with a numeric value or using a predetermined mapping for various ranges in timing difference. The physical cell identity (PCI) of the cell is one example of a way that the cell could be identified.

In another example, the UE could report "Cell1, PCI, sync DC, observed timing difference" and "Cell2: PCI, async DC, observed timing difference." Other options are also possible and permitted.

Observed timing difference could be excluded from the report. In certain embodiments, the level of the synchronization between cells can be split into more than two groups, depending on the timing difference. The UE could be configured to indicate the level of observed synchronization in the reporting, for example a combination of the synchronization status field and the observed timing difference field.

In one possible example or embodiment, an existing message could be used or reused. For example, an existing measurement report could be reused and/or extended to include needed information. The UE could indicate in a measurement report, either one that is event triggered or periodic, whether the reported cell(s) can be considered synchronized. This report may indicate synchronization compared to the serving cell. Such an approach may enable the network to choose which cells to consider in DC operation.

In another possible embodiment, the UE could adjust the UE's DC capability dynamically, and signal this to NW, depending on the observed synchronization conditions.

Re-use of measurement reporting can include a variety of options, such as defining a new event for the purpose of certain embodiments. For example, there could be a new event which is conditioned by being fulfilled only in case the DC timing conditions (sync/async) are fulfilled for the UE.

This event could potentially be in addition to the existing threshold but also without. Another alternative is to configure the UE only to report cells if DC conditions are fulfilled for certain cases, such as for cells among a list of cells on a carrier or any cell on a given carrier.

An alternative to the above is that the UE can in a generic manner indicate sync DC/async DC conditions fulfilled. Alternatively, the UE can indicate only when DC conditions are fulfilled. For example, the UE may only report, or may only report a particular cell, when a given sync/async condition is fulfilled.

The situation of a sync DC capable UE already configured with DC and entering the situation where the sync conditions are no longer fulfilled can also be handled by re-using existing signaling. Existing or modified reporting can be applied in a similar way as explained above, such as measurement reporting. Alternatively the UE could declare radio link failure (RLF) on PSCell. Another alternative could be that UE is allowed or need to stop UL transmission on PSCell, or UE may stop monitoring on PSCell—e.g. PDCCH monitoring or other PSCell actions.

At 140, the network can receive the explicit or implicit indication from the UE or, as described below, can observe the behavior of the UE that can imply a condition of the DC synchronization. Accordingly, at 150, the network can determine the DC synchronization status from such communicated information.

At 105, the network may indicate to configure the UE to behave according to above description. Thus, the network may indicate whether the UE should provide the information related to sync/async DC conditions.

All of the above can be configured and/or indicated on a per cell list or on a per carrier approach.

The method can also include, at 160, communicating with the UE based on the determination of the DC synchronization condition. This communicating may be based on a comparison of the DC synchronization condition to capability information for the UE, such as whether or not the UE can support asynchronous DC.

According to a further approach, there may not be a need for support from new signaling between UE and network. The approach here may be that the UE behavior would be defined in the specifications directly. For example, a specification could specifically state what the UE behavior is expected to be. For example, one such possible behavior could be that if the UE is only capable of sync DC and configured with DC, then in case the sync DC timing conditions are no longer fulfilled, the UE behavior can e.g. be specified to stop UL transmissions on PSCell and/or to stop physical downlink control channel (PDCCH) monitoring on PSCell. Another alternative is that the UE can declare RLF on the PSCell.

Figure 2:
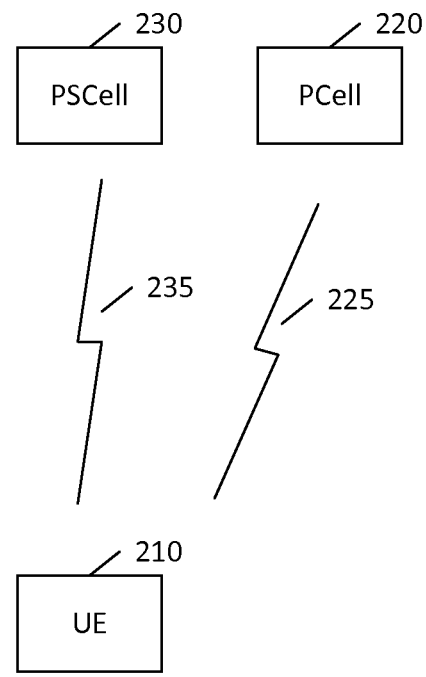
FIG. 2 illustrates an architecture of a system according to certain embodiments.

FIG. 2 illustrates an architecture of a system according to certain embodiments. As shown in FIG. 2, a user equipment (UE) 210 may be in dual connectivity with a primary cell (PCell) 220 and primary secondary cell (PSCell) 230. UE 210 may detect a timing difference between a first signal 225 received from PCell 220 and a second signal 235 received from PSCell 230. Based on this observed closeness of timing or lack thereof, the UE 210 may make a determination as to whether or not a synchronized condition exists. In making this determination, UE 210 may compare an observed timing difference to a predetermined threshold, such as for example 33 microseconds. Other predetermined thresholds are also permitted.

Figure 3:
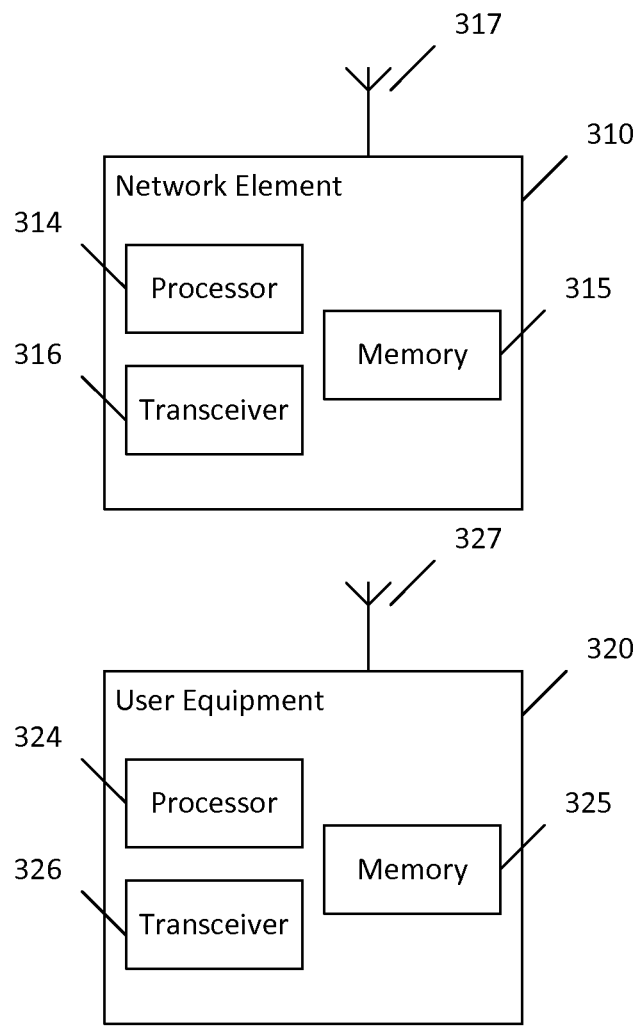
FIG. 3 illustrates a system according to certain embodiments of the invention.

FIG. 3 illustrates a system according to certain embodiments of the invention. It should be understood that each block of the flowchart of FIG. 1 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element, such as a PCell base station or a PSCell base station. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIG. 1.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments may provide clear UE behavior. Moreover, certain embodiments may provide the network with information about the observed UE conditions One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
determining a dual connectivity synchronization condition for a user equipment with respect to at least two base stations, wherein the determining comprises comparing a timing difference between the at least two base stations with a predetermined threshold; and
reporting the dual connectivity synchronization condition to a network element,
wherein the reporting comprises implying to the network element that a dual connectivity synchronization condition has changed,
wherein the implying comprises implying by user equipment behavior, and
wherein the user equipment behavior comprises stopping uplink communication on a primary secondary cell, stopping physical downlink control channel monitoring on primary secondary cell, declaring radio link failure on primary secondary cell, or any combination thereof.

2. A method, comprising:
receiving an implicit indication of a dual connectivity synchronization condition of a user equipment, wherein the indication is based on a prior comparison of a timing difference between at least two base stations with a predetermined threshold, wherein the receiving the implicit indication comprises observing a user equipment behavior, wherein the user equipment behavior comprises stopping uplink communication on a primary secondary cell, stopping physical downlink control channel monitoring on primary secondary cell, declaring radio link failure on primary secondary cell, or any combination thereof,
determining the dual connectivity synchronization condition of the user equipment based on the observed behavior; and
communicating with the user equipment based on the determined dual connectivity synchronization condition.

3. The method of claim 2, further comprising:
configuring a user equipment to
determine the dual connectivity synchronization condition for the user equipment with respect to at least two base stations; and
report the dual connectivity synchronization condition to a network element.

4. An apparatus comprising:
at least one processor; and
at least one memory including computer program code,
wherein the at least one memory and the computer program code are configured to, with the at least one processor, cause the apparatus at least to
determine a dual connectivity synchronization condition for a user equipment with respect to at least two base stations, wherein the determination of the dual connectivity synchronization condition comprises comparing a timing difference between the at least two base stations with a predetermined threshold; and
report the dual connectivity synchronization condition to a network element,
wherein the report comprises implying to the network element that a dual connectivity synchronization condition has changed,
wherein the implying comprises implying by user equipment behavior, and
wherein the user equipment behavior comprises stopping uplink communication on a primary secondary cell, stopping physical downlink control channel monitoring on primary secondary cell, declaring radio link failure on primary secondary cell, or any combination thereof.

5. An apparatus, comprising:
at least one processor; and
at least one memory including computer program code, wherein the at least one memory and the computer program code are configured to, with the at least one processor, cause the apparatus at least to receive an implicit indication of a dual connectivity synchronization condition of a user equipment, wherein the indication is based on a prior comparison of a timing difference between at least two base stations with a predetermined threshold, wherein the reception of the implicit indication comprises an observation a user equipment behavior, wherein the user equipment behavior comprises stopping uplink communication on a primary secondary cell, stopping physical downlink control channel monitoring on primary secondary cell, declaring radio link failure on primary secondary cell, or any combination thereof, determine the dual connectivity synchronization condition of the user equipment based on the observed behavior; and communicate with the user equipment based on the determined dual connectivity synchronization condition.

6. The apparatus of claim 5, wherein the at least one memory and the computer program code are configured to, with the at least one processor, cause the apparatus at least to configuring a user equipment to determine the dual connectivity synchronization condition for a user equipment with respect to at least two base stations; and report the dual connectivity synchronization condition to a network element.

\* \* \* \* \*